No. 867,729. PATENTED OCT. 8, 1907.
D. J. HOLLIGER.
SCALE.
APPLICATION FILED JUNE 20, 1907.
2 SHEETS—SHEET 1.
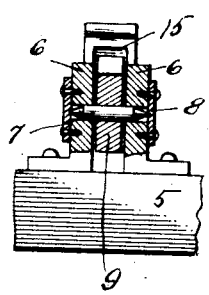
Fig. 3.
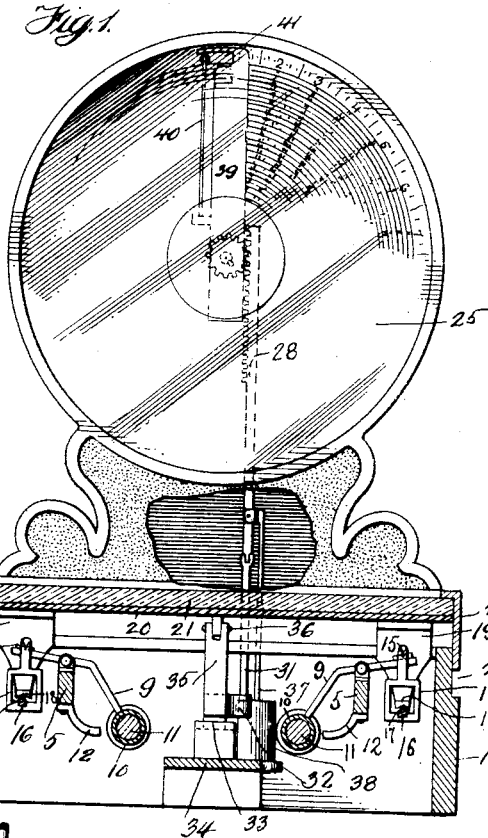
Fig. 1.
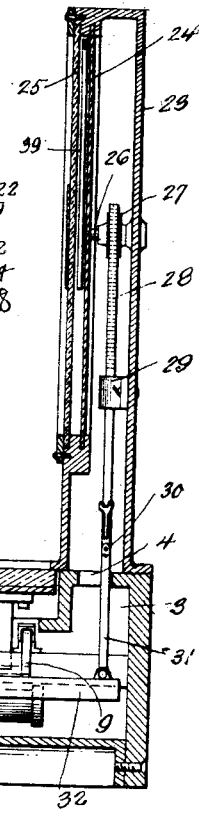
Fig. 2.
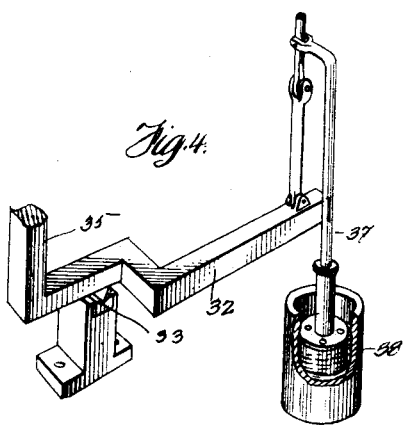
Fig. 4.
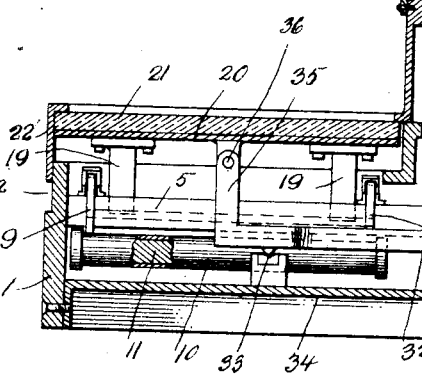
WITNESSES:
Samuel Payne
R. H. Butler
INVENTOR
D. J. Holliger
BY H. C. Evert & Co.
Attorneys No. 867,729.
PATENTED OCT. 8, 1907.
D. J. HOLLIGER.
SCALE.
APPLICATION FILED JUNE 20, 1907.
2 SHEETS—SHEET 2.
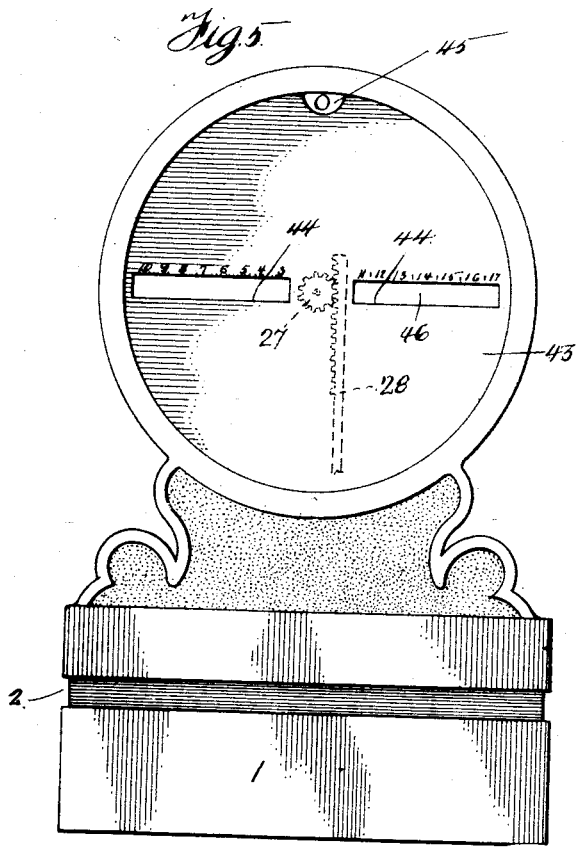
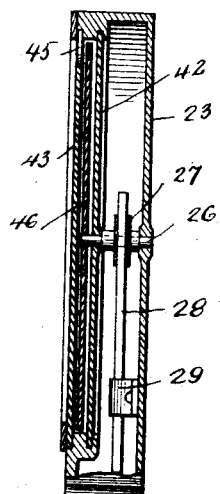
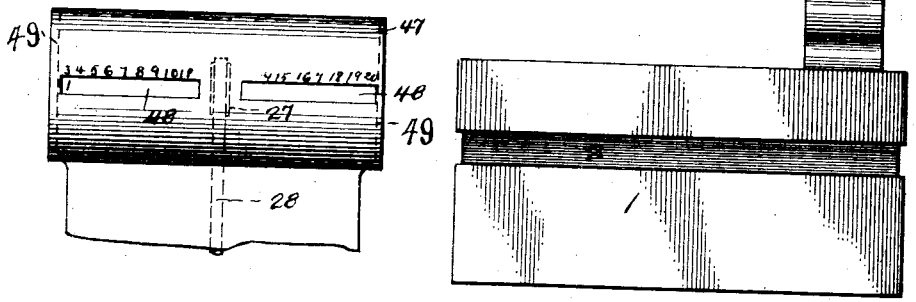
WITNESSES:
Samuel Payne.
R. H. Butler.
INVENTOR
D. J. Holliger.
BY H. C. Evert & Co.
Attorneys

UNITED STATES PATENT OFFICE.

DANIEL J. HOLLIGER, OF COLUMBUS, OHIO.

SCALE.

No. 867,729.

Specification of Letters Patent.

Patented Oct. 8, 1907.

Application filed June 20, 1907. Serial No. 379,900.

*To all whom it may concern:*

Be it known that I, DANIEL J. HOLLIGER, a citizen of the United States of America, residing at Columbus, in the county of Franklin and State of Ohio, have invented certain new and useful Improvements in Scales, of which the following is a specification, reference being had therein to the accompanying drawing.

This invention relates to improvements in scales, of that type commonly styled computing scales, designed for use in grocery stores and similar places.

The object of this invention is to provide a novel scale having a positive and reliable action, accomplished by comparatively few parts, which are strong and durable and compactly arranged.

Another object of this invention is to provide a dust-proof scale having durable pivotal bearings insuring accuracy, and rendering the scale free from danger of injury by ordinary use.

With the above and other objects in view, which will more readily appear as the invention is better understood, the same consists of the novel construction, combination and arrangement of elements to be presently described and then specifically pointed out in the appended claims.

Referring to the drawings forming part of this application, like numerals of reference designate corresponding parts throughout the several views, in which, Figure 1 is a cross sectional view of the scale partly in elevation. Fig. 2 is a longitudinal sectional view of the scale. Fig. 3 is a detail sectional view of the pivotal point of the weight levers of the scale. Fig. 4 is a perspective view of the rack actuating lever. Fig. 5 is a front elevation of a scale, illustrating a modified form of construction. Fig. 6 is a side elevation of the same partly in section. Fig. 7 is a front elevation of a drum that can be used in connection with the scale.

The scale consists of a rectangular casing 1 having its upper outer edges cut away, as at 2, and the rear edge of the casing 1 is provided with a transversely arranged raised housing 3 having a central opening 4. In the casing 1 are longitudinally disposed beams 5, carrying bracket 6 for a hard steel bearing pin 7 having its pointed ends journaled in plates 8 secured to the outer sides of the bracket 6. Mounted upon the steel pin 7 are levers 9 carrying tubes 10 loaded with lead 11 or a similar material. The tubes and their contents serve functionally as counter balance weights, and in using lead or similar material that can be easily removed, the weights can be adjusted to insure accuracy.

Longitudinal beams 5 carry buffers 12 for limiting the downward movement of the tubes 10.

The opposite ends of the weight levers are provided with double links 14, said links having an agate or knife-edge bearing upon the levers, as at 15. The links 14 support longitudinally disposed rods 16, having sharp bearing edges 17 for supporting the agate ends 18 of supports 19. The supports 19 are suitably connected to a metallic plate 20 carrying a marble or glass platform slab 21, the front and side edges of which are provided with depending plates 22 overlapping the cut away edges of the casing 1, and protecting the interior mechanism of said casing from dust and foreign matter.

Upon the raised housing 3 of the casing 1 is constructed a dial frame 23 having a stationary graduated dial 24 protected by a transparent plate 25. Journaled between the stationary dial and the frame 23 is a shaft 26 upon which is mounted a pinion 27 meshing with the rack 28 slidably mounted in the bracket 29, carried by the frame 23. The lower end of the rack 28 is pivotally connected, as at 30, to a pivoted rod 31 carried by the rear end of a rack actuating lever 32, said lever 32 being pivotally mounted upon an agate bearing 33, carried by a longitudinally disposed support 34 secured in the casing 1. The rack actuating lever 32 is provided with an extension 35, which is pivotally connected to a depending pierced lug 36, carried centrally of the metallic plate 20.

The lower end of the rack 28 is provided with a depending arm 37 entering a conventional form of dash-pot 38, carried by the support 34.

The shaft 26 protrudes through the stationary dial 24 and is provided with a hand or arm 39 having an indicator wire 40. The hand or arm 39 is cut away, as at 41, to permit of the outermost graduations representing pounds, being observed upon the stationary dial 24.

In Figs. 5 and 6 of the drawings, I have illustrated the dial frame 23 as provided with stationary plates 42 and 43, plate 43 having diametrically opposed elongated openings 44 formed therein and also with an opening 45. The end of the shaft 26 is provided with a revoluble graduated dial 46, the outer row of graduations being observed through the opening 45, while the remainder of the graduations are observed through the opening 44. The edges of the openings 44 are also graduated.

In Fig. 7 of the drawings, I have illustrated a drum 47 adapted to be used in lieu of the frame 23, said drum having slots 48 through which the revoluble cylinders 49 journaled in the drum are observed. The cylinders are actuated similarly to the hand and dial previously described. It is thought that the manner in which the scale operates is apparent, but I desire to call attention to the functions performed by several elements of my invention. In the first place, the dash-pot 38 is adapted to relieve the scale of any jarring due to sudden deposit of an article upon the platform slab 21 of the scale. In using agate or knife-edge bearings, I provide practically a non-wearing scale, thus dispensing with the necessity of continually adjusting the scale.

I do not care to confine myself to the graduations upon the dial, as the graduations can be advantageously arranged for computing different weights, the cost per pound, and numerous other calculations common in the mercantile business.

Such variations in the size, proportion, minor details of my invention, as are permissible by the appended claims, can be resorted to, without departing from the spirit and scope of the invention.

Having fully described my invention, what I claim and desire to secure by Letters Patent is:

1. A scale consisting of a casing, beams arranged in said casing, weighted levers pivotally mounted upon said beams, links suspended from said levers, rods carried by said links, supports carried by said rods, a slab carried by said supports, a dial frame arranged upon said casing, a graduated dial carried by said frame, a rack slidably mounted in said frame, pinion meshing with said rack, a hand revolved by said pinion, a lever fulcrumed in said casing and connecting with said rack, and with said slab, and a dash-pot for controlling the movement of said rack.

2. A scale consisting of a casing, weight levers pivotally mounted in said casing, links suspended from said levers, a slab supported indirectly by said links, a dial frame carried by said casing, a hand revolubly mounted in said frame, a rack arranged in said frame for revolving said hand, a lever fulcrumed upon said casing and connected respectively to said platform and to said rack, and a dash-pot for controlling the movement of said rack.

3. A scale consisting of a casing, weighted lever pivotally mounted in said casing, links suspended from said levers, a slab supported indirectly by said links, a dial frame carried by said casing, a lever fulcrumed in said casing connecting with said slab, and means located in said dial frame and actuated by said lever for designating the weight upon said dial, and means for governing the movement of said lever.

4. A scale consisting of a casing, weighted levers pivotally mounted therein, a slab indirectly supported by said levers, a dial frame carried by said casing, a lever fulcrumed in said casing and connecting with said slab, means actuated by said lever for designating the weight upon said dial, and means for controlling the movement of said lever.

5. A scale consisting of a casing, weighted levers pivotally mounted therein, a slab indirectly supported by said levers, a dial frame carried by said casing, a lever fulcrumed in said casing and connecting with said slab, and means actuated by said lever for designating the weight upon said dial.

In testimony whereof I affix my signature in the presence of two witnesses.

DANIEL J. HOLLIGER.

Witnesses:
F. CHAMBERLAIN,
MAX H. SROLOVITZ.